May 20, 1958  G. B. RICHARDS  2,835,229
ROTARY POSITIVE DISPLACEMENT DEVICE FOR LIQUIDS
Filed July 19, 1955  4 Sheets-Sheet 1
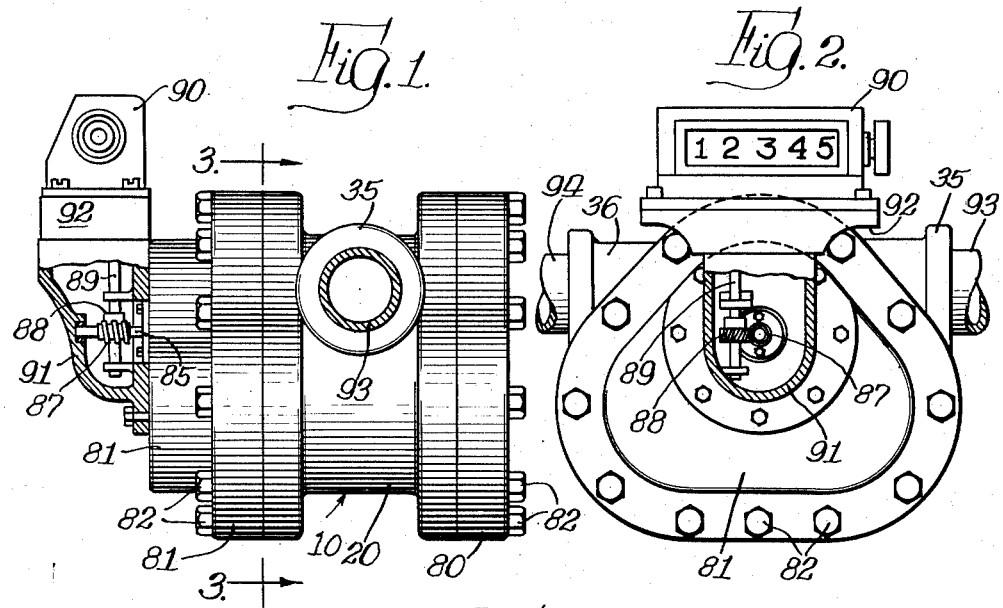
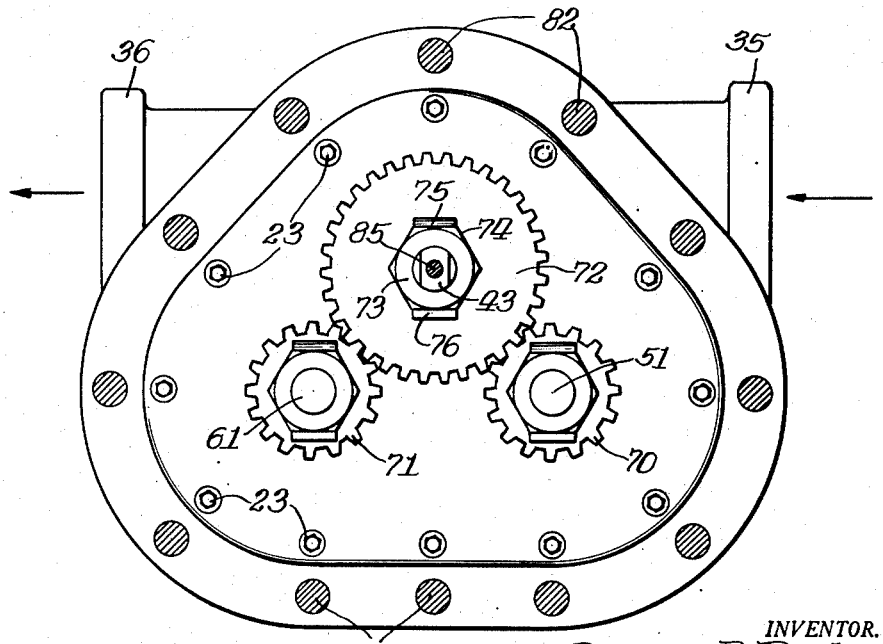
INVENTOR.
George B. Richards

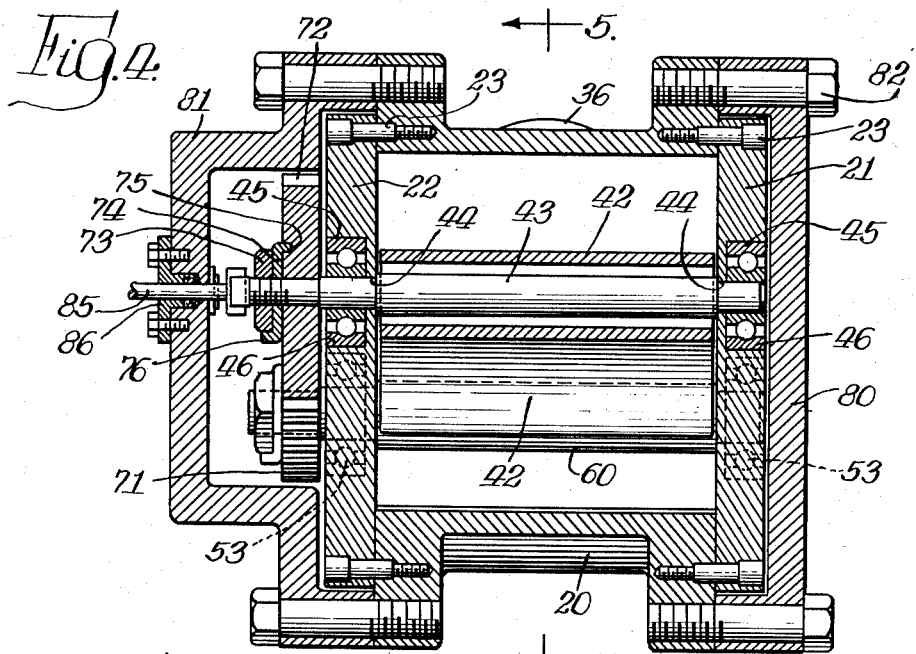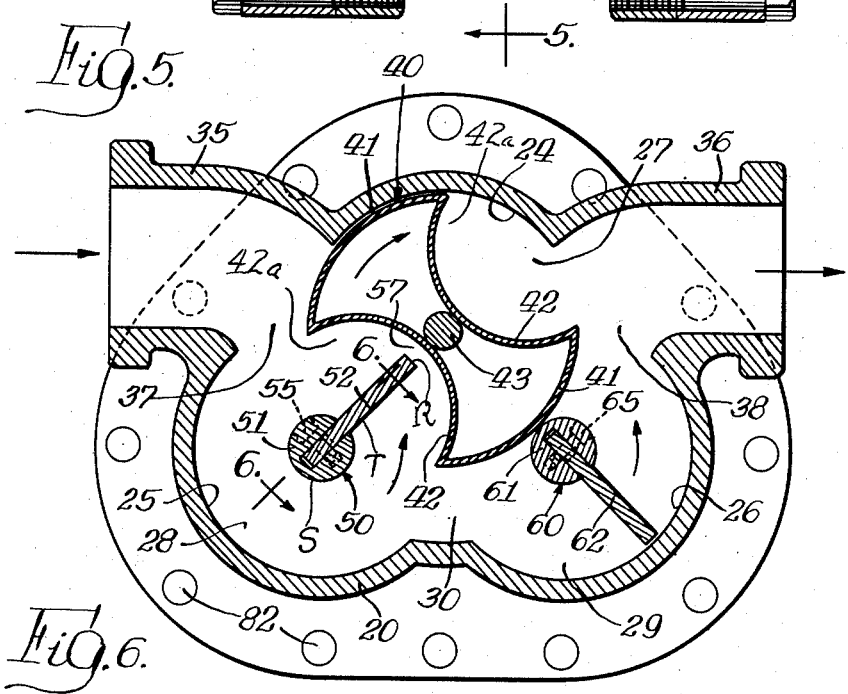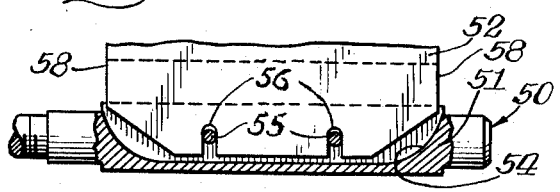

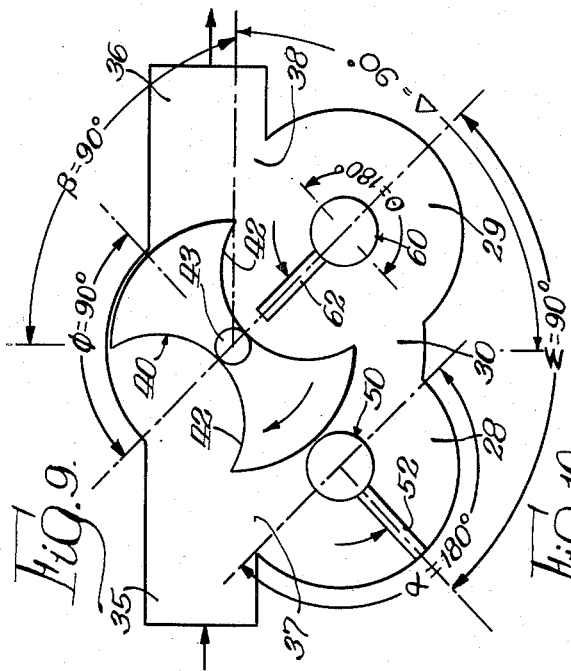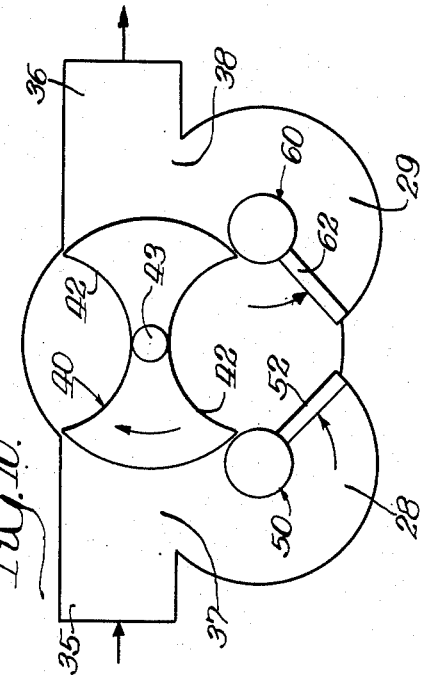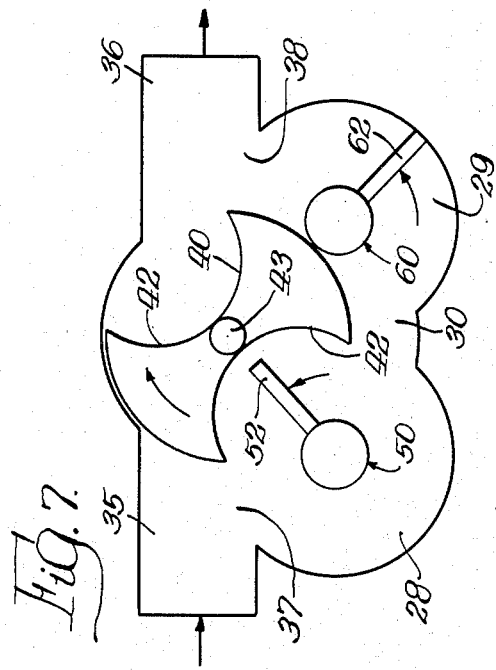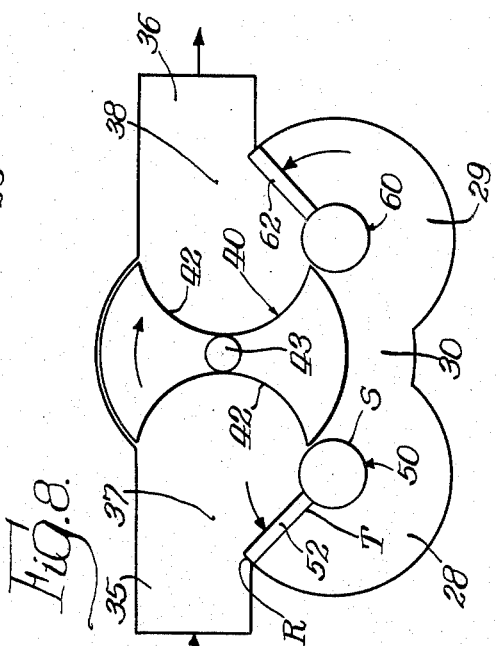

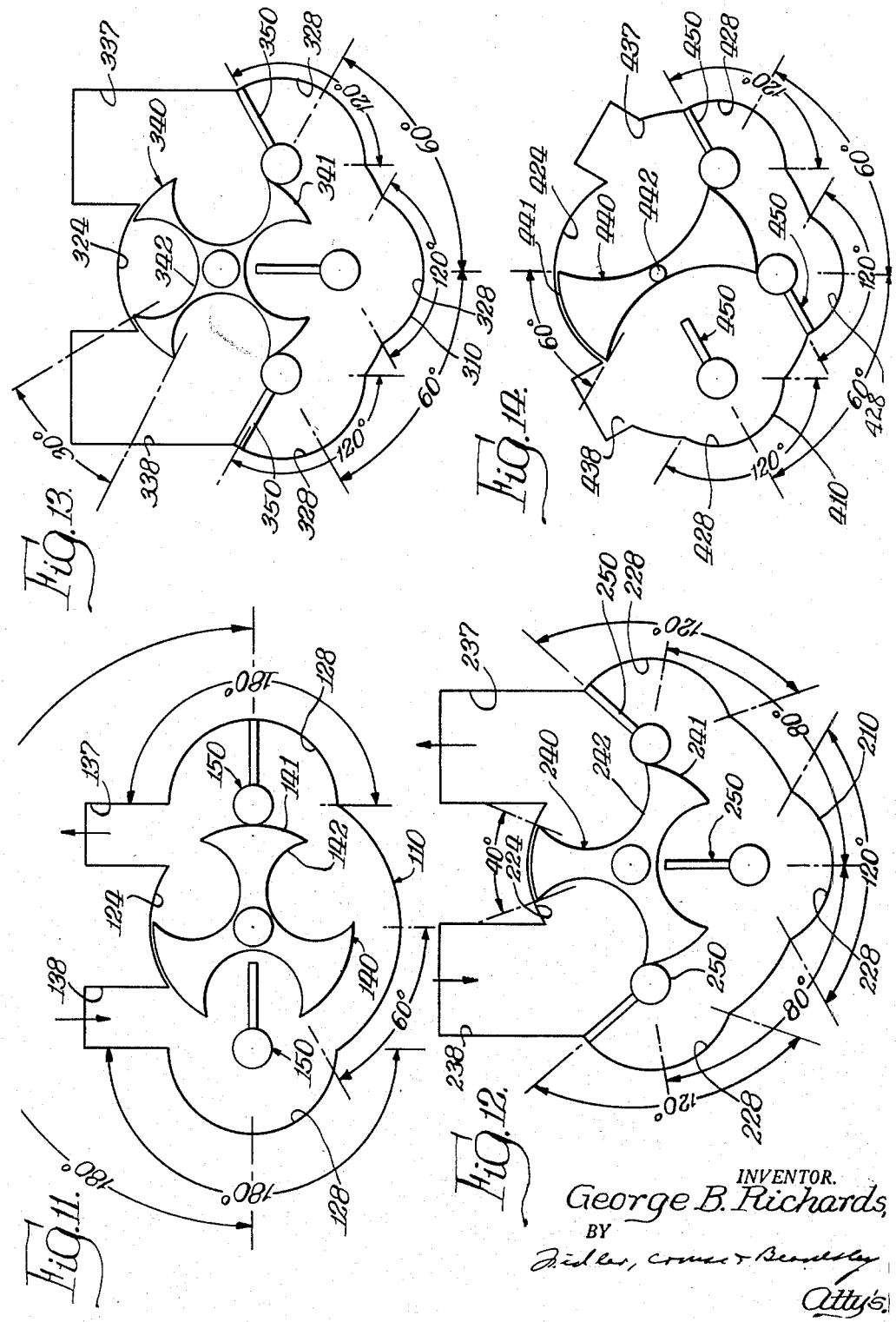

United States Patent Office 2,835,229
Patented May 20, 1958

2,835,229

ROTARY POSITIVE DISPLACEMENT DEVICE FOR LIQUIDS

George B. Richards, Deerfield, Ill., assignor, by mesne assignments, to Liquid Controls Corporation, North Chicago, Ill., a corporation of Illinois Application July 19, 1955, Serial No. 522,930

18 Claims. (Cl. 121—71)

This invention relates to a rotary positive displacement device for liquids and has to do more particularly with such a device which is especially well adapted for use as a liquid displacement meter. The device also may be used as a pump, motor, compressor or blower.

Liquid displacement meters are used in numerous applications for measuring the flow of liquids. One such application is in the field of petroleum products wherein such meters are used in connection with production, transportation, refining and marketing of such products. Meters of this type are also used in connection with other liquid products and particularly those which are produced, stored, transported and dispensed in large quantities, and therefore are handled in bulk form. Obviously it is highly desirable and usually necessary that such meters exhibit a high degree of accuracy over a long period of use.

Rotary positive displacement meters have been provided which are satisfactorily accurate but their construction has been relatively expensive owing to the design. Attempts have been made to reduce the cost of construction but this has resulted in loss of accuracy, excessive servicing requirements and other disadvantages.

One of the common causes of inaccuracy of prior meters has been the actions known as "compressing" the liquid or "drawing a vacuum on" the liquid passing through the meter. In the first named action, the liquid is trapped in a space between the members of the meter in such manner that the space between the members becomes smaller as the members move through a cycle of operation. Thus, the members exert a compressive force upon the liquid, which results in pulsation of the meter and loss of energy, with consequent inaccuracy in the measurement of the liquid. The term "drawing a vacuum on the liquid" is applied to an action which is the converse of "compressing" the liquid. In the latter, the members move in such manner that the liquid passes through a space which increases in size during each cycle. Thus, the members tend to create a vacuum in the space with resulting pulsation and inaccuracy of measurement.

An object of the present invention is to provide an improved rotary positive displacement device for liquids which is simple in construction, easy and inexpensive to manufacture, effective in operation, and rugged and long wearing.

Another object is to provide a rotary positive displacement meter for liquids which is simple in construction and highly accurate over a long period of use.

Another object is to provide a rotary positive displacement device for liquids having a relatively high capacity even though small in size.

Another object is to provide a rotary positive displacement meter wherein there is substantially no compression of or vacuum drawn on the liquid when passing through the meter and consequently substantially no diminution in accuracy even when the meter is operated at relatively high speeds.

Another object is to provide a rotary positive displacement device for liquids wherein the inertia of the movable members is relatively low, there is no rubbing friction between the relatively movable displacement members, and there is a minimum of interference with the smooth flow of liquid through the meter.

Another object is to provide a rotary displacement device for liquids where there is substantially no pulsation in the liquid passing through the meter and consequently a substantially uniform displacement of liquid in each cycle of operation.

A further object is to provide a rotary positive displacement device for liquids of the type having a blocking rotor and a pair of displacement rotors cooperating therewith wherein the blocking rotor is statically and dynamically balanced.

A further object is to provide a rotary positive displacement device for liquids having a minimum of interior pockets, crevices, partitions or other constructional features of such nature as might tend to collect debris and wherein the movement of the displacement members is such as to automatically force debris from the interior of the meter.

A further object is to provide a rotary positive displacement device for liquids which is of such construction that it permits ready access to the interior for cleaning where such is necessary or desirable.

A further object is to provide a rotary positive displacement meter for liquids of the type having displacement rotors where the latter are readily accessible and readily adjustable for use with liquids of different viscosities.

A further object is to provide a rotary positive displacement device for liquids wherein there is no metal-to-metal contact between the relatively movable liquid displacement and confining members.

Another object is to provide a rotary positive displacement device for liquids wherein all of the seals between relatively moving members, are so made that the possibility of trapping liquid between such members is minimized or eliminated.

Another object is to provide a rotary positive displacement device of the type embodying displacement rotors cooperating with a blocking rotor, wherein equal volumes of liquid are displaced during equal angular increments of rotation of the displacement rotors.

Other objects and advantages of the invention will appear from the following description taken in connection with the appended drawings, wherein:

Figure 1 is a side elevational view of a meter embodying the invention, with a portion broken away and in section;

Fig. 2 is an end elevational view of the meter of Fig. 1, with a portion broken away and in section;

Fig. 3 is an enlarged sectional view taken along line 3—3 of Fig. 1;

Fig. 4 is an enlarged, vertical, sectional view through the meter of Fig. 1 with the counter mechanism omitted;

Fig. 5 is a view of a section taken along line 5—5 of Fig. 4;

Fig. 6 is a fragmentary, sectional view taken along line 6—6 of Fig. 5;

Figs. 7 to 10 inclusive are reduced, diagrammatic views corresponding to Fig. 5 and showing the principal elements of the meter in different positions which they assume in passing through a cycle of operation; and Figs. 11 to 14 are diagrammatic views showing respectively four modified forms of the invention.

Referring now to Figs. 1 to 6 of the drawings illustrating the preferred form of my invention, the meter of the present invention includes a casing 10 formed by a tubular body or member 20, and end plates 21, 22 respectively, suitably secured to the body 20 as by bolts 23 for closing the ends of the body 20. The casing 10 defines a hollow space of generally trefoil cross-sectional form, the casing having three cylindrically arcuate sealing wall portions 24, 25 and 26 providing what, for convenience may be termed a blocking rotor cavity or chamber 27, an inlet cavity or chamber 28 and an outlet cavity chamber 29 respectively. The inlet and outlet cavities or chambers 28, 29 are connected by a connecting passage 30 which in the present illustrative embodiment of the invention is relatively short. The sealing wall surfaces are so disposed that their central medial planes intersect at the axis of rotation of the displacement rotor at an angle of 90°.

The casing 10 is provided with inlet and outlet portions 35 and 36 respectively which define inlet and outlet passages opening into the inlet and outlet chambers 28, 29 respectively through inlet and outlet ports 37, 38 located at points between the arcuate wall portions 24 and 25 and between the portions 24 and 26 respectively. At this point it should be noted that the form of the casing 10 is such that the inlet and outlet portions 35, 36 are disposed on more or less opposite sides of the casing and preferably are in alignment at their outermost portions. It will also be noted that the passage through the casing 10 leading from the inlet portion and successively through he chambers 28 and 29 and the outlet portion 36, while not a straight line, does not undergo any abrupt change in direction and the flow of liquid through the casing therefor will be relatively smooth as hereinafter explained more in detail.

Disposed in the casing 10 and concentrically with the blocking rotor chamber 27 is a blocking rotor 40 having a periphery formed with two diametrically opposed convex, cylindrically arcuate sealing portions 41 concentric with the center of the rotor 40 and two diametrically opposed concave arcuate portions 42 providing recesses 42a in the rotor 40. For a purpose which will hereinafter appear, the peripheral portions 41 each preferably extend through equal arcs of 90 degrees each, and the recesses 42a between such peripheral portions also are 90 degrees in extent.

The blocking rotor 40 includes a hub or shaft 43 which extends through aligned openings 44 in the end plates 21, 22 and is journaled in bearings 45, 45 which preferably take the form of ball bearings but which may be sleeve-type bearings. The bearings 45 are seated in bearing sockets 46, 46 formed in the outer faces of the end plates 21, 22. The bearings 45, 45 (as well as the other rotor bearings hereinafter described which are similarly located in the outer faces of the end plates) thus are located externally of the space within the casing and therefore are not subjected to the liquid which passes through the meter.

The blocking rotor 40 is of such size that when the rotor is rotated, its convex peripheral portions 41, 41 sweep in close proximity to the arcuate wall portion 24, the spacing between such portions of the rotor and the wall being so slight that a liquid seal is provided therebetween. The angular extent of the sealing or blocking surface 24 is at least as great as and preferably slightly greater than that of each of the recesses 42a so that there is a seal between the blocking rotor and the blocking surface at all times. The blocking rotor thus prevents any by-passing of liquid from the inlet port 37 through the chamber 27 to the outlet port 38. For the purpose of enhancing this sealing effect the convex peripheral portions 41 of the blocking rotor are provided with very minute serrations (not shown) extending parallel to the axis of the rotor, which serrations form with the wall 24 a labyrinthine seal. In other words, when the rotor is rotated the serrations cause such turbulence in the liquid present in the slight space between the peripheral portions 41 and the wall 24 as to prevent any substantial flow of liquid between such surfaces.

The rotor 40 may be constructed in various ways but preferably it is of hollow construction in order to reduce the weight and consequently the inertia thereof. It may conveniently be formed from tube stock. A tube of suitable material is cut in half longitudinally along a diametrical plane, thereby providing two semi-cylindrical members. These two semi-cylindrical members, which are to form the concave peripheral portions 42 of the rotor, are welded to the hub 43 in diametrically opposite positions and the assembly is turned to the proper size, thereby removing the marginal portions of the semi-cylindrical members. A tube of the proper diameter is then slipped over the previous assembly and is tack-welded thereto at the edges of the portions 42. The tube is then cut, as by slit milling, to remove the portions which are disposed oppositely to the peripheral portions 42 and which extend between the edges thereof. Thereafter the rotor is turned to its final diameter.

The mode of forming the rotor as just described permits the use of stainless steel in forming the rotor which I have found to be of great advantage in constructing meters with use for certain corrosive products. This material is particularly suitable because of its rigidity and also its inertness to corrosive products. Also it is unnecessary to perform any casting or any extensive machining operation in the construction of the rotor; neither is any hardening operation required. It might be explained at this point also that the blocking rotor shaft 43, as well as other shafts to be referred to hereinafter, may be formed of stainless steel.

It will be noted that since each of the peripheral sections, namely the sections 41, 41 and the sections 42, 42, is 90 degrees in extent and they are diametrically opposed respectively, the rotor is balanced both statically and dynamically. The body of the rotor formed by the portions 41, 41 and 42, 42 may be conveniently secured to the hub or shaft 43 by welding.

The blocking rotor 40 preferably is open at both ends and is filled with liquid at all times. Thus there is no pressure differential between the interior of the blocking rotor and the interior of the casing exteriorly of the blocking rotor and the pressure of the liquid is uniform throughout the interior of the meter.

Disposed in the inlet chamber 28 is a displacement rotor 50 which includes a hub or shaft 51 and a "blade" 52. The hub 51 is journaled in bearings 53, 53 similar to the bearings 45 above described and mounted in the end plates 21, 22 in a similar manner. The hub 51 is formed with diametrically extending slot 54 in which the blade 52 is closely fitted and suitably secured as by screws 55 threaded into counterbores in the hub. The slot 54 may, if desired, be extended into the interior of the bearing race. The screws 55 extend through slots 56 in the blade 52 whereby the latter may be adjusted radially with respect to the hub.

The displacement rotor 50 is disposed to rotate about an axis concentrically with respect to the wall 25 of the inlet chamber 28 so that the outer edge or outer sealing surface R of the blade 52 sweeps along the wall 25 in close proximity thereto but slightly spaced therefrom. The outer free edge 57 and the end edges 58, 58 are provided with longitudinally extending serrations (not shown) which form labyrinthine seals respectively with the opposing walls of the inlet chamber 28. The sealing wall 25 has an angular extent of approximately 180° and preferably exactly 180° and the outer end surface of the displacement rotor 50 is arranged to sweep in sealing relation with such surface through the entire angular extent thereof.

A second displacement rotor 60 is disposed in the outlet chamber 29 and is constructed and arranged in a manner similar to the displacement rotor 50 except as hereinafter explained. It includes a hub 61 and a blade 62 with the outer free edge of the latter positioned to sweep past and in close proximity to the wall 26 of the outlet chamber 29. The blade 62 is secured in the hub 61 by a screw 65 in the same way as the blade 50 is secured in the hub 51. Therefore, when the rotors 50 and 60 are installed, the counterbore in the hub 61 into which the screw 65 is threaded is displaced at 90 degrees from the position of the counterbore in the hub 51, for a purpose which will hereinafter appear.

The diameters of the hubs 51 and 61 are such that each is adapted to pass very close to, but slightly spaced from, the path of movement of the peripheral portions 41 of the blocking rotor 40 so as to provide a liquid seal between the hubs 51 and 61 on the one hand and the peripheral portions 41 on the other hand when the latter are in opposing relation to either of the hubs respectively. The hubs 51 and 61 preferably are provided with longitudinally extending serrations (not shown) which provide labyrinthine seals similar to the seals between the rotors and the walls as above described. At this point it should be noted that the surface portion inner sealing surface S of each of the hubs 51 and 61 which is adapted to seal against the blocking rotor is cylindrically arcuate in form and is concentric with the axis of rotation of its rotor. In the preferred embodiment the inner sealing surface S extends equally on either side of the medial longitudinal plane through the displacement rotor. Such sealing surface has an angular extent equal to the angular extent of the sealing surface of the corresponding displacement cavity and hence in the meter shown in Figs. 1 to 6 is 180°.

The surface portion T of each displacement rotor against which the liquid is effective to exert a displacing force and which may be designated and the "displacement surface" is that portion of the leading face of the rotor between the inner sealing surface S on the hub and the outer sealing surface R on the blade. The liquid does not exert a displacing force against the sealing surfaces R or S.

At this point it should be noted that the displacement rotors may take other forms than that illustrated. However, it is important that each be formed with an inner sealing surface shaped and disposed as shown and described, an outer sealing surface of relatively narrow extent and a displacement surface so formed as to permit clearance between itself and the blocking rotor and so formed as not to trap liquid or cause substantial turbulence in the liquid.

The serrations (not shown) formed in the various members as hereinbefore described may be made in various sizes depending upon the viscosity of the material to be metered, but they should be sufficiently small to provide the appropriate degree of turbulence and at the same time prevent loss of efficiency of the meter. I have found that where the meter is to be employed for metering light petroleum products, excellent results have been obtained by making the serrations approximately $\frac{1}{16}$ inch deep and approximately $\frac{1}{32}$ inch wide.

The recesses 42a in the blocking rotor defined by the concave peripheral portions 42 are made sufficiently deep to permit each of the displacement blades 52, 62 to sweep therethrough when the several rotors are rotated in the manner intended. Preferably the clearance between the blade edge and the concave portions 42 is made sufficient to provid for recirculation of the liquid, without undue restriction; that is, flow of liquid through the space between the displacement rotor and the blocking rotor when the latter is moving through a blocking rotor recess, without undue restriction. For example, in the meter illustrated in Figs. 1-6 I provide a clearance which may be as much as 50% of the distance from the axis of rotation of the displacement rotor to the outer sealing surface. The concave peripheral portions 42 may take any form so long as they provide sufficient clearance for the blades 52, 62. I prefer to make the recesses arcuate in form as this provides the most compact and efficient structure.

The blocking rotor 40 and the displacement rotors 50 and 60 are connected together in driving relationship so that they rotate simultaneously and at predetermined angular velocity and are maintained in predetermined angular or phase relationship. The blocking rotor 40 is driven to rotate at a speed of one-half the speed of rotation of the displacement rotors, which latter rotate at the same speed. To this end timing gears 70, 71 are secured on the portions of the hubs 51, 61 which project beyond the end plate 22. A driven timing gear 72 is carried on the portion of the hub 43 which extends beyond the end plate 22. The timing gears 70, 71 and 72 are arranged in meshing relation as shown, particularly in Fig. 3 of the drawings. Each of the aforementioned gears is secured on its hub and locked against relative annular movement thereon by a nut 73 and a nut retainer 74, a stud portion 75 of which is inserted in a socket in the gear and a lug portion 76 of which is bent over against a side of the nut 73.

The bearings in the end plate 21 are enclosed by a cover plate 80 and the bearings in the end plate 22, as well as the ends of the hubs and the gears carried thereby, are enclosed by a cover plate 81, both of which cover plates are suitably secured to the body 20 as by bolts 82.

The bearings may be lubricated by filling the spaces between the end covers and the end plates with a suitable liquid lubricant and maintaining the liquid pressure equal on both sides of the bearing. Alternatively, a small opening, for example, around $\frac{1}{32}$ inch may be provided in each end plate for balancing the pressure.

A countershaft 85 (Fig. 4) is journaled in a sealed bearing 86 and is suitably connected in driven relation, preferably by a tongue and slot connection to the shaft 43 of the blocking rotor. The countershaft 85 is connected by a suitable drive (Figs. 1 and 2) such as a worm 87, a worm gear 88 and a shaft 89, to a counter 90 of any suitable commercial construction, which drive preferably is enclosed in a casing 91 secured to the cover plate 81. An adjuster 92 of suitable commercial construction preferably is provided and is mounted on the casing 91 and, in turn, serves to mount the counter 90. The casing 91 may be adjusted or indexed at suitable increments relatively to the meter housing about the axis of the countershaft. Also the counter 90 may be indexed relatively to the casing 91.

The counter 90 is adapted to count the revolutions of the blocking rotor, which bear a predetermined fixed relation to the revolutions of the displacement rotors and thereby indicate the amount of liquid passing through the meter. The counter 90, as is customary, is calibrated to indicate the amount of liquid passing through the meter in units of liquid measure, as for example gallons, or weight, as for example pounds.

When the meter is to be used for metering liquids it is connected in the liquid line by attaching an inlet pipe 93 and an outlet pipe 94 to the inlet and outlet portions of the casing respectively.

The flow of liquid through the meter causes the displacement rotors 50 and 60 to rotate, and since each is connected by the gearing above described to the blocking rotor 40, the latter is rotated at an angular velocity one-half that of the displacement rotors. The angular relationship between the displacement rotors and the blocking rotor is maintained throughout the operation of the device. It is assumed for the purpose of description that one cycle of the meter consists of one revolution of the blocking rotor.

Figs. 7 to 10 inclusive, to which reference now is made, represent diagrammatically four different positions of the rotors in executing one-half of a cycle of operation. Referring to the position of the rotor shown in Fig. 8 it will be noted that the inlet rotor 50 is in sealing or working position and thus is in sealing relation with both the blocking rotor 40 and with the sealing wall of the inlet chamber 28 and closes off the inlet port 37 from the chamber 28. In this same position of the rotors the outlet rotor 60 is similarly in sealing relation with the blocking rotor and with the casing and closes off the outlet port 38 from the chamber 29. It will be noted that in the sealing position of each displacement rotor, three seals are effected, namely a seal between the displacement rotor and the casing, a seal between the displacement rotor and the blocking rotor and a seal between the blocking rotor and the casing. The liquid passing through the meter causes the inlet rotor 50 to sweep around the inlet chamber 28 (Fig. 9), then past the connecting passage 30 (Fig. 10), then into one of the recesses of the blocking rotor 40 (Fig. 7), which latter has been rotated into position to receive the rotor blade 52, and then into the position shown in Fig. 8 to complete one revolution or one-half of a complete cycle of the meter.

The outlet rotor 60 is arranged at an angular position of 90 degrees from the inlet rotor 50. Because of the 90 degree relationship between the inlet and outlet chambers the outlet rotor 60 is in a position wherein it closes the outlet chamber 29 when the inlet rotor closes the inlet chamber 28 (Fig. 8) and moves into position opening the outlet chamber at the time that the inlet rotor is closing the inlet chamber. Thus, during the above described movement of the inlet rotor 50, the outlet rotor 60 moves past the outlet port 38 to open the latter to the outlet chamber 29 and into one of the recesses of the blocking rotor (Fig. 9), sweeping through this recess while the inlet rotor is sweeping along its chamber 28. The outlet rotor 60 then sweeps across the connecting passage 30 (Fig. 10) and then around the outlet chamber (Fig. 7) and back to the position shown in Fig. 8.

It will be seen that the relative arrangement of the chamber walls, the displacement rotors and the blocking rotor is such that the seal between each displacement rotor and the blocking rotor is made simultaneously with the seal between the blade of that displacement rotor and the wall at the inlet end of the corresponding chamber. Likewise, the seal between each displacement rotor and the blocking rotor is broken simultaneously with the breaking of the seal between the blade of that rotor and wall at the outlet end of the chamber. The arrangement is such that each displacement rotor is successively in sealing relation with the blocking rotor and with the casing during one-half of its revolution or what may be termed its "displacement" or "working" phase and then is spaced from both the casing and the blocking rotor during the remainder of its revolution or what may be termed its "return" or "non-working" phase. Moreover, it will be seen that while each displacement rotor is passing through its displacement phase, the other is passing through its return phase.

The relative arrangement of the counterbores in the hubs of the displacement rotors referred to hereinbefore is such as to insure that full sealing is effected at all times between at least one of the displacement rotors and the blocking rotor. It will be understood that the portion of the periphery of each hub in which the counterbore is formed will not be continuous and therefore the seal between that portion of the periphery of the hub and the periphery of the blocking rotor may not be completely effective. However, the relative positions of the counterbores is such that when the counterbored portion of the periphery of one rotor is in sealing relation to the blocking rotor, the other displacement rotor is in a position wherein the uninterrupted periphery of the hub is in sealing relation with the periphery of the blocking rotor. Thus there is no point in the cycle wherein both counterbores are in sealing relation to the blocking rotor simultaneously and accordingly the possibility of leakage past the counterbore portions of the hubs is minimized.

During the second half cycle of the meter the displacement rotors 50 and 60 each make another revolution while the blocking rotor 40 completes its revolution. During this second half of the cycle the displacement rotors cooperate, respectively, with different recesses of the blocking rotor than during the first half of the cycle, but the operation otherwise is the same.

During the execution of each half cycle of the meter as above described, the inlet rotor first closes the inlet chamber, then sweeps the inlet chamber to displace a quantity of liquid equal to the effective volume of the inlet chamber—that is, equal to the volume of the chamber between the two extreme positions of the displacement rotor 50 in sweeping the chamber (Figs. 8 and 10 respectively). During this movement of the inlet rotor the outlet chamber is open to allow an equal quantity of liquid to be discharged from the meter. Immediately thereafter the outlet rotor sweeps the outlet chamber to displace a quantity of liquid equal to the effective volume of the outlet chamber, thus completing the half cycle of the meter. It will be seen therefore that during each half cycle of the meter a quantity of liquid is displaced which is equal to twice the effective volume of the inlet chamber (or the outlet chamber, since their effective volumes are equal). Since each of the displacement blades sweeps its chamber twice during a full cycle of the meter (i. e. one revolution of the blocking rotor), it follows that a quantity of liquid is displaced during each cycle of the meter equal to four times the effective volume of the inlet chamber (or the outlet chamber).

The meter of the present invention, as will be seen, positively measures in an accurate manner the liquid displaced therethrough during each full cycle of operation of the meter or, in fact, during any portion of a revolution of the rotors. The rotation of the blocking rotor 40 operates through the gears 87 and 88, the countershaft 89 and the adjuster 92 to drive the counter 90. The counter as aforesaid counts the number of revolutions and provides an indication thereof but preferably in terms of the volume or weight of liquid displaced during the revolutions counted.

The meter may be made in a wide range of sizes to suit different uses. Where it is to be used for metering light petroleum products excellent results have been obtained by making a meter in accordance with the preferred form of the invention wherein the displacement rotors each had a radius of 1⅜ inches measured from the center of the hub to the outer free edge of the blade. The blocking rotor in such meter was 3¼ inches in diameter and the length of the interior space and consequently the length of the several chambers was 4 inches. The meter displaced 44 cubic inches per cycle (i. e. per revolution of the blocking rotor) and thus, when rotated at a desirable speed, namely around 375 R. P. M. (of the blocking rotor), developed a capacity of 70 gallons per minute. The meter may be made in such sizes as to develop a capacity of around 1 to around 15,000 gallons per minute or even more.

The meter of the present invention is not limited to use with products of low viscosity but may be used to measure the flow of products of relatively high viscosity such as No. 5 and No. 6 burning oils, "Bunker C" (300 Saybolt Furol at 122° F.) and asphaltum.

In order to provide in a meter of the size above described an effective labyrinthine seal for metering liquids having a viscosity around 40 Saybolt seconds, Universal, the clearance between the relatively movable displacement members is adjusted to approximately 0.0015 inch.

While I prefer to employ a meter such as shown in Figs. 1 to 10 and described hereinabove, having two displacement rotors and a blocking rotor provided with two recesses, I may employ a greater number of displacement rotors, with a blocking rotor having an equal number of recesses. Alternatively, I may employ a blocking rotor having a greater or lesser number of recesses than there are displacement rotors in the meter. Four illustrative examples of such modified forms of my invention are shown diagrammatically in Figs. 11 to 14, respectively to which detailed reference will be made hereinafter.

However, before proceeding to describe such other embodiments of the invention I wish to point out certain of the principles and factors upon which the design of my meter is based, and which apply generally to all forms of the invention. These are as follows:

(1) All sealing contacts between (a) the displacement rotors and the casing (b) the displacement rotors and the blocking rotor and (c) the blocking rotor and the casing (except the sealing contacts between the rotors and the casing end walls) are on cylindrical surfaces and constant radii.

(2) Three seals only (in addition to the constantly maintained seals between the rotors and the casing end walls) are maintained at all times and all seals are shifted simultaneously so that when sealing contact between a displacement rotor and its displacement cavity exist, a seal exists only between the same displacement rotor and the blocking rotor and also a seal exists between the blocking rotor and the casing.

(3) There are an equal number of displacement rotors (D) and displacement cavities (C).

(4) The total angular extent of all of the displacement cavities is equal to 360°, and hence the angular extent ($\alpha$) of each displacement cavity equals 360° divided by the number of cavities (D).

(5) The angle ($\Sigma$) between the axes of adjacent displacement rotors relative to the axis of the blocking rotor is equal to 360° divided by the number of recesses (B) in the blocking rotor less the angular extent ($\beta$) of one convex segment (sealing surface) of the blocking rotor surface.

(6) The angular extent ($\beta$) of each sealing surface on the blocking rotor is equal to 360° divided by the product of the number of recesses in the blocking rotor (B) and the number of displacement rotors (D).

(7) The angular extent ($\theta$) of the surface on each displacement rotor which makes sealing contact with the blocking rotor is equal to the angular extent ($\alpha$) of the sealing contact between the displacement rotor and the casing.

(8) The angular extent, ($\phi$) of the surface on the casing making sealing contact with the blocking rotor seals must be at least as great as the angular extent ($\Delta$), of a recess in the blocking rotor.

(9) All recesses in the blocking rotor are of equal angular extent and are arranged at equal angular distances around the blocking rotor.

Applying the foregoing design principles to the form of meter shown in Figs. 1 to 10 and described hereinabove, it will be seen that there are two displacement rotors and an equal number of displacement cavities; the angular extent ($\alpha$) of each displacement cavity is $$\frac{360°}{2}$$

or 180°; the angle ($\Sigma$) between adjacent displacement rotors is $$\frac{360°}{2} - \frac{360°}{2 \times 2}$$

or 90°; the angular extent ($\beta$) of each sealing surface on the blocking rotor is $$\frac{360°}{2 \times 2}$$

or 90°; the angular extent ($\theta$) of the sealing surface on each displacement rotor is 180°; and the angular extent ($\phi$) of the blocking surface of the casing is at least 90°.

It should be noted that in certain cases, the relationship $$\Sigma = \frac{360°}{B} - \frac{360°}{BD}$$

may result in a value which for all practical sizes of the meter would cause interference between the rotors. In such a case it is necessary to multiply the term $$\frac{(360)}{(B)}$$

by an integer greater than unity, for Example 2, in order to obtain a value for $\Sigma$ which permits of a practical design of meter.

Referring now to Figs. 11 to 14 inclusive, it will be understood that the meters are illustrated very diagrammatically therein. All are generally similar in construction to the preferred form of meter shown in Figs. 1 to 10 and described herein above. However, the modified forms of meter are provided with different numbers of displacement rotors, or different numbers of blocking rotor recesses, or both, and the casings are differently shaped and the several members are differently proportioned and arranged accordingly. Also, where a greater number of displacement rotors are provided, there are of course a corresponding number of gears (not shown).

In each modified form, two ports, namely an inlet port and an outlet port, are provided and the displacement cavities are arranged in a series between the ports. Only one blocking rotor is provided and it cooperates with a blocking surface located between the two ports.

The meter shown in Fig. 11 includes a casing 110 having an inlet port 138, an outlet port 137, two displacement cavities 128, and a blocking wall portion 124. Rotatably mounted in the casing 110 are two displacement rotors 150 positioned to sweep in sealing relation with the walls of the displacement cavities 128. Also rotatably mounted in the casing 110 is a blocking rotor 140 having three recesses 142 adapted to receive the displacement rotors and three sealing portions 141 positioned to pass in sealing relation with the sealing wall 124 and with the displacement rotors. The three rotors are interconnected by gearing (not shown) for simultaneous rotation in a fixed phase relation whereby the displacement rotors are successively and singly in sealing relation with the casing and simultaneously with the blocking rotor. The operation of this form of meter is analogous to that of the preferred form. It will be noted however, that the blocking rotor is rotated at such a rate relatively to the displacement rotors that each of the latter passes in sealing relation with each of the sealing surfaces 141 and then passes through the following recess 142.

It will be seen from Fig. 11, that the angular extent of each displacement cavity is 180°; the angle between adjacent displacement rotors is 180°; the angular extent of the inner sealing surface on each displacement rotor is 180°; the angular extent of each sealing surface on the blocking rotor is 60°; and the angular extent of the sealing surface on the casing against which the blocking rotor seals is at least 60°.

Another form of meter is shown in Fig. 12 which includes a casing 210 having an inlet port 238, an outlet port 237, three displacement cavities 228, and a blocking wall portion 224. Rotatably mounted on the casing 210 are three displacement rotors 250 positioned to sweep in sealing relation with the walls of the displacement cavities 228. Also rotatably mounted in the casing 216 is a blocking rotor 240 having three recesses 242 adapted to receive the displacement rotors and three sealing portions 241 positioned to pass in sealing relation with the sealing wall 224 and with the displacement rotors. The four rotors are interconnected by gearing (not shown) for simultaneous rotation in a fixed phase relation whereby the displacement rotors are successively and singly in sealing relation with the casing and simultaneously with the blocking rotor. The operation of this form of meter is analogous to that of the preferred form. It will be noted particularly that the arrangement is such that the three displacement rotors successively sweep through their respective cavities and that only one such rotor is in the working phase while the others are in the non-working phase. Thus, seals which each displacement rotor makes simultaneously with the casing and the blocking rotor are made just as the seals which the preceding displacement rotor makes.

It will be seen from Fig. 12, that the angular extent of each displacement cavity is 120°; the angle between adjacent displacement rotors is 80°; the angular extent of the inner sealing surface on each displacement rotor is 120°; the angular extent of each sealing surface on the blocking rotor is 40° and the angular extent of the sealing surface on the casing against which the blocking rotor seals is at least 120°.

Still another form of meter is shown in Fig. 13 and includes a casing 310 having an inlet port 338, an outlet port 337, three displacement cavities 328, and a blocking wall portion 324. Rotatably mounted in the casing 310 are three displacement rotors 350 positioned to sweep in sealing relation with the walls of the displacement cavities 328. Also rotatably mounted in the casing 310 is a displacement rotor 340 having four recesses 342 adapted to receive the displacement rotors and four sealing portions 341 positioned to pass in sealing relation with the sealing wall 324 and with the displacement rotors. The four rotors are interconnected by gearing (not shown) for simultaneous rotation in a fixed phase relation whereby the displacement rotors are successively and singly in sealing relation with the casing and simultaneously with the blocking rotor. The operation of this form of meter is analogous to that of the preferred form.

It will be seen from Fig. 13, that the angular extent of each displacement cavity is 120°; the angle between adjacent displacement rotors is 60°; the angular extent of the sealing surface on each displacement rotor is 120°; the angular extent of each sealing surface on the blocking rotor is 30°; and the angular extent of the sealing surface on the casing against which the blocking rotor seals is at least 120°.

In Fig. 14 a meter is shown which includes a casing 410 having an inlet port 438, an outlet port 437, three displacement cavities 428, and a blocking wall portion 424. Rotatably mounted on the casing 410 are three displacement rotors 450 positioned to sweep in sealing relation with the walls of the displacement cavities 428. Also rotatably mounted in the casing 410 is a displacement rotor 440 having two recesses 442 adapted to receive the displacement rotors and two sealing portions 441 positioned to pass in sealing relation with the sealing wall 424 and with the displacement rotors. The four rotors are interconnected by gearing (not shown) for simultaneous rotation in a fixed phase relation whereby the displacement rotors are successively and singly in sealing relation with the casing and simultaneously with the blocking rotor. The operation of this form of meter is analogous to that of the preferred form.

It will be seen from Fig. 14, that the angular extent of each displacement cavity is 120°; the angle between adjacent displacement rotors is 60°; the angular extent of the sealing surface on each displacement rotor is 120°; the angular extent of each sealing surface on the blocking rotor is 60° and the angular extent of the sealing surface on the casing against which the blocking rotor seals is at least 120°.

Since the meter is of the positive displacement type and since there is a minimum of inertia in the moving parts and a minimum of interference with the smooth streamline flow of liquid through the meter, the pressure loss is very low and the meter therefore is very accurate. Since the blocking rotor rotates at a relatively low speed, namely, a fraction of the angular velocity of the displacement rotors, the starting inertia of the meter is relatively low. Also, since there is no metal-to-metal contact and no rubbing friction between the relatively movable displacement elements, the friction loss is almost negligible. Additionally, the arrangement of shape of the members is such that there is no end thrust.

It will be noted that by reason of the novel arrangement of the structural elements of the present invention, there is no compression of, nor vacuum drawn on, the liquid at it flows through the meter. Therefore, there is no pulsation in the liquid and there is a uniform displacement of liquid during each cycle. It will be noted particularly that the arrangement is such that at the time the inlet rotor blade moves out of the cavity of the blocking rotor, the cavity is not sealed but is open to the inlet chamber and hence no vacuum will be drawn on the liquid by the movement of the inlet rotor blade. Also, it will be seen that when the outlet rotor blade moves into the cavity of the blocking rotor, the cavity is open to the outlet chamber and hence there is no compression of the liquid by the action of the blade in moving into the cavity. Furthermore, the construction is such that where one or more displacement rotors are provided between the inlet and outlet rotors, there is no tendency either to compress or draw a vacuum on the liquid.

The shape of the casing and the arrangement of the rotors in the preferred form of the invention provides inlet an outlet ports of maximum size. Moreover, as mentioned hereinbefore, the passage through the casing is such as to permit a relatively smooth flow of liquid through the meter. Thus, there is a minimum of resistance to the flow of liquid through the meter.

In the preferred form of the invention, the inlet and outlet ports are located on opposite sides of the casing and preferably are in alignment which facilitates connecting the meter in a liquid conduit or line. For example, an "in line" connection may be made. On the other hand, where the situation makes it desirable, the meter may be constructed with the inlet and outlet portions of the casing arranged at different angles with respect to the meter casing than in the illustrative embodiment.

The provision of two single bladed displacement rotors and a cooperating blocking rotor having two recesses or cavities, as in the preferred form of my invention, makes it possible to employ displacement rotors having blades of maximum effective lengths. Consequently the meter has a maximum displacement per revolution. Therefore the capacity of the meter for any given external size is relatively high. It will be noted in this connection that for each rotation of the blocking rotor, a quantity of liquid is displaced which is equal to four times the effective capacity of either the inlet or outlet chamber.

The construction of the meter is such that it is completely symmetrical, and therefore completely reversible, thus the port above referred to as the outlet port may be connected to the line so as to be the inlet port and the liquid caused to drive the meter in the opposite direction from that above described. In the case where the meter is used with a conventional counter, the latter would be reversed in order to obtain a positive reading. Where the counter itself is reversible, the meter could be used in a subtractive manner, in which case the counter would deduct the amount of the reverse flow from any previous positive flow. The meter may also be reversed in respect to its orientation relatively to the line to which it is connected. Where such is desirable, the meter may be reversed by merely removing the cover plates, end plates and the parts carried thereby and reassembling all such members with the casing in reversed relation.

The arrangement of the rotors and their direction or rotation is such as to sweep out of the meter any debris which might be carried in by the incoming liquid. Such debris is carried along in the direction of the flow of liquid and discharged from the meter. There are no pockets or crevices in which, or obstructions against which, such debris would tend to lodge. In this connection it should be noted that the direction of flow of the liquid is such that any debris tends to be carried away from the seals between the blocking rotor and the displacement rotors and not carried into such seals.

The meter of the present invention requires very little servicing. It is very simple in construction and therefore has very few parts which require adjustment or which can be adjusted. Moreover, there are no displacement parts subject to rubbing friction and there is little, if any, wear. Where it is necessary to clean the meter, this can be done very readily by removing the cover plates and end plates which provide ready access to the interior. The bearings preferably are of standard construction and may be readily replaced should sufficient wear occur to render such replacement necessary.

This application is a continuation-in-part of my copending application Serial No. 374,370 filed August 14, 1953, now abandoned.

This application discloses but does not claim certain subject matter disclosed and claimed in my copending application Serial No. 391,488, filed November 12, 1953.

I claim:

1. A rotary positive displacement device for liquids comprising a hollow casing having inlet and outlet ports and a plurality of rotor-sealing wall portions intermediate said inlet and outlet ports, a pair of displacement rotors rotatably mounted in said casing in position to pass in sealing relation to two of said sealing wall portions respectively, each said displacement rotor being disposed to pass in sealing relation to its sealing wall portion for approximately 180° of its rotation, a blocking rotor rotatably mounted in said casing and having peripheral portions of substantially equal angular extent, with alternate of said peripheral portions positioned to pass successively in sealing relation to a third of said sealing wall portions and said displacement rotors, and the remainder positioned to pass in spaced relation to said displacement rotors, and means interconnecting all of said rotors for simultaneous rotation in a fixed phase relation whereby first one and then the other of said displacement rotors is in sealing relation with said casing and with said blocking rotor, while the other displacement rotor is in spaced relation with said casing and said blocking rotor.

2. A rotary positive displacement device for liquids comprising a hollow casing having inlet and outlet ports and a plurality of rotor-sealing wall portions intermediate said inlet and outlet ports, a pair of displacement rotors rotatably mounted in said casing in position to pass in sealing relation to two of said sealing wall portions respectively, each said displacement rotor being disposed to pass in sealing relation to its sealing wall portion for approximately 180° of its rotation, a blocking rotor rotatably mounted in said casing for rotation about an axis located at the intersection of perpendicular planes through the axes of said displacement rotors and having peripheral portions each of approximately 90° angular extent with alternate of said peripheral portions positioned to pass successively in sealing relation to a third of said sealing wall portions and said displacement rotors, and the remainder positioned to pass in spaced relation to said displacement rotors, and means interconnecting all of said rotors for simultaneous rotation in a fixed phase relation whereby first one and then the other of said displacement rotors is in sealing relation with said casing and with said blocking rotor, while the other displacement rotor is in spaced relation with said casing and said blocking rotor.

3. A rotary positive displacement device for liquids comprising a hollow casing having inlet and outlet ports of substantially equal cross-sectional areas and a plurality of rotor-sealing wall portions intermediate said inlet and outlet ports, inlet and outlet displacement rotors having substantially equal fluid-displacing areas and rotatably mounted in said casing in position to pass in sealing relation to two of said sealing wall portions respectively, each said rotor being disposed to pass in sealing relation to its sealing wall portion for approximately 180° of its rotation, a blocking rotor rotatably mounted in said casing and having peripheral portions of substantially equal angular extent, with alternate peripheral portions positioned to pass successively in sealing relation with another of said sealing wall portions and one of said displacement rotors, and in spaced relation to the other of said displacement rotors, and means interconnecting all of said rotors for simultaneous rotation in a fixed phase relation whereby first one and then the other of said displacement rotors is in sealing relation with said casing and with said blocking rotor, while the other displacement rotor is in spaced relation with said casing and said blocking rotor.

4. A rotary positive displacement device for liquids comprising a hollow casing having inlet and outlet ports and a plurality of rotor-sealing wall portions intermediate said inlet and outlet ports, a plurality of displacement rotors rotatably mounted in said casing in position to pass in sealing relation to an equal number of said rotor-sealing wall portions respectively, each said displacement rotor being disposed to pass in sealing relation to its sealing wall portion for that portion of its revolution corresponding to the number of displacement rotors, a blocking rotor rotatably mounted in said casing and having spaced peripheral portions positioned to pass successively in sealing relation with another of said sealing wall portions and said displacement rotors, each such portion being of such angular extent that it is in sealing relation with each of said displacement rotors only while such rotor is in sealing relation with said casing, and the remaining peripheral portions of the blocking rotor being positioned to pass in spaced relation to said displacement rotors, and means interconnecting all of said rotors for simultaneous rotation in a fixed phase relation whereby said displacement rotors are successively and singly in sealing relation with said casing and simultaneously with said blocking rotor.

5. A rotary positive displacement device for liquids comprising a hollow casing having two cylindrically arcuate wall portions each of approximately 180° extent providing side walls of interconnected inlet and outlet cavities, said casing also having an inlet port and an outlet port communicating, respectively, with said cavities, a pair of displacement rotors mounted for rotation about the centers of curvature of said side walls, respectively, each of said displacement rotors having a hub and a portion projecting radially from said hub and of sufficient radial length to sweep the side wall of the corresponding cavity in sealing relation thereto, a blocking rotor rotatably mounted in said casing in offset relation to said inlet and outlet cavities and having alternate sealing and concave peripheral portions of substantially equal angular extent, with said sealing portions positioned to sweep successively in sealing relation with a wall portion of said casing intermediate said inlet and outlet ports and in sealing relation with the hubs of said displacement rotors, and with said concave portions positioned to receive successively said hub and projecting portions in spaced relation with said blocking rotor, and means connecting all of said rotors for simultaneous rotation in a fixed phase relation whereby during approximately one half of each revolution of each displacement rotor it is in sealing relation with the side wall of its cavity and simultaneously in sealing relation with said blocking rotor and during the remainder of a revolution, it is spaced from said casing and said blocking rotor, the angular extent of each of the sealing portions of said blocking rotor being such that the sealing relations between each of the said displacement rotors and said blocking rotor and said cavity side wall are made simultaneously and broken simultaneously.

6. A rotary positive displacement device for liquids comprising a hollow casing having two cylindrically arcuate wall portions disposed with their centers of curvature parallel and each of approximately 180° extent and providing side walls of interconnected inlet and outlet cavities, said casing also having an inlet port and an outlet port communicating, respectively, with said cavities, a pair of displacement rotors mounted for rotation about the centers of curvature of said side walls respectively, each of said displacement rotors having a hub and a portion projecting radially from said hub and of sufficient radial length to sweep the side wall of the corresponding cavity in sealing relation thereto, a blocking rotor rotatably mounted in said casing for rotation about an axis at the intersection of perpendicular planes through the axes of said displacement rotors and having alternate sealing and concave peripheral portions of 90° angular extent, with said sealing portions positioned to sweep successively in sealing relation with a wall portion of said casing intermediate said inlet and outlet ports and in sealing relation with the hubs of said displacement rotors, and with said concave portions positioned to receive successively said hub and projecting portions in spaced relation with said blocking rotor, and means connecting all of said rotors for simultaneous rotation in a fixed phase relation whereby during approximately one half of each revolution of each displacement rotor it is in sealing relation with the side wall of its cavity and simultaneously in sealing relation with said blocking rotor and during the remainder of a revolution, it is spaced from said casing and said blocking rotor, the angular extent of each of the sealing portions of said blocking rotor being such that the sealing relations between each of the said displacement rotors and said blocking rotor and said cavity side wall are made simultaneously and broken simultaneously.

7. A rotary positive displacement device for liquids comprising a hollow casing having two cylindrically arcuate wall portions each of approximately 180° extent providing side walls of interconnected inlet and outlet cavities, said casing also having an inlet port and an outlet port communicating, respectively, with said cavities, a pair of displacement rotors mounted for rotation about the centers of curvature of said side walls respectively, each of said displacement rotors having a hub with a cylindrical convex periphery and a portion projecting radially from said hub and of sufficient radial length to sweep the side wall of the corresponding cavity in sealing relation thereto, a blocking rotor rotatably mounted in said casing in offset relation to said inlet and outlet cavities and having alternate concave and cylindrical convex peripheral portions of substantially equal angular extent, with said convex portions positioned to sweep successively in sealing relation with a wall portion of said casing intermediate said inlet and outlet ports and in sealing relation with the hubs of said displacement rotors, and with said concave portions positioned to receive successively said hub and projecting portions in spaced relation with said blocking rotor, and means connecting all of said rotors for simultaneous rotation in a fixed phase relation whereby during approximately one half of each revolution of each displacement rotor it is in sealing relation with the side wall of its cavity and simultaneously in sealing relation with said blocking rotor and during the remainder of a revolution, it is spaced from said casing and said blocking rotor, the angular extent of each of the convex portions of said blocking rotor being such that the sealing relations between each of the said displacement rotors and said blocking rotor and said cavity wall portion are made simultaneously and broken simultaneously.

8. A rotary positive displacement device for liquids comprising a hollow casing having two cylindrically arcuate wall portions each of approximately 180° extent providing walls of interconnected inlet and outlet cavities, said casing also having an inlet port and an outlet port communicating, respectively, with said cavities, a pair of displacement rotors eccentrically mounted for rotation about the centers of curvature of said cavities, respectively, each of said displacement rotors having a major radial dimension of sufficient length that the outermost peripheral portion sweeps the wall of the corresponding cavity in sealing relation thereto, a blocking rotor rotatably mounted in said casing in offset relation to said inlet and outlet cavities and having alternate sealing and concave peripheral portions of substantially equal angular extent, with said sealing portions positioned to sweep successively in sealing relation with a wall of said casing intermediate said inlet and outlet ports and in sealing relation with peripheral portions of said displacement rotors located closer to the axis than said major radial dimension, and with said concave portions positioned to receive successively said closer peripheral and outermost peripheral portions in spaced relation with said blocking rotor, and means connecting all of said rotors for simultaneous rotation in a fixed phase relation whereby during approximately one half of each revolution of each displacement rotor it is in sealing relation with the wall of its cavity and simultaneously in sealing relation with said blocking rotor and during the remainder of a revolution, it is spaced from said casing and said blocking rotor, the angular extent of each of the sealing portions of said blocking rotor being such that the sealing relations between each of the said displacement rotors and said blocking rotor and said cavity wall portion are made simultaneously and broken simultaneously.

9. A rotary positive displacement device for liquids comprising a hollow casing having first and second interior cylindrically arcuate wall portions each of approximately 180° angular extent disposed with their centers of curvature parallel and a third interior cylindrical wall portion having its center of curvature parallel to said first and second centers, a blocking rotor mounted in said casing for rotation about said third center and having alternate convex and concave peripheral portions of substantially equal angular extent, with said convex portions disposed to sweep in sealing relation with said third wall portion and spaced from said first and second wall portions, two displacement rotors mounted in said casing for rotation about said first-named centers respectively, each of said displacement rotors having a hub portion positioned to rotate in sealing relation successively with the convex peripheral portions of said blocking rotor and a projection positioned to sweep successively in sealing relation with the corresponding one of two said first-named wall portions, and through one of said concave peripheral portions in spaced relation to said blocking rotor, the angular extent of each of said convex peripheral portions being such that it is in sealing relation with the hub of the displacement rotor only while the blocking rotor projection is in sealing relation with its corresponding one of said two first-named wall portions, and means connecting all of said rotors for simultaneous rotation in a fixed phase relation whereby during one half a revolution of said displacement rotors, a first one of said displacement rotors is simultaneously in sealing relation with its corresponding wall portion and said blocking rotor while the second displacement rotor is spaced from its corresponding wall portion and said blocking rotor, and during the remainder of the revolution of said displacement rotors, said first displacement rotor is spaced from its corresponding wall portion and said blocking rotor, and said second displacement rotor is simultaneously in sealing relation to its corresponding wall portion and said blocking rotor, said casing having inlet and outlet passages communicating respectively with the spaces between said blocking rotor and said first and second wall portions respectively.

10. A rotary positive displacement device for liquids comprising a hollow casing having first and second interior cylindrically arcuate wall portions each of approximately 180° angular extent disposed with their centers of curvature parallel and a third interior cylindrical wall portion having its center of curvature parallel to said first and second centers and at the intersection of perpendicular planes including said first and second centers respectively, a blocking rotor mounted in said casing for rotation about said third center and having two diametrically opposite convex peripheral portions each of approximately 90° angular extent, with said convex portions disposed to sweep in sealing relation with said third wall portion and spaced from said first and second wall portions, two displacement rotors mounted in said casing for rotation about said first and second centers respectively, each of said displacement rotors having a hub portion positioned to rotate in sealing relation successively with the convex peripheral portions of said blocking rotor and a projection positioned to sweep successively in sealing relation with the corresponding one of said first and second wall portions and through one of said concave peripheral portions in spaced relation to said blocking rotor, and means connecting all of said rotors for simultaneous rotation in a fixed phase relation whereby during one half a revolution of said displacement rotors, a first one of said displacement rotors is simultaneously in sealing relation with its corresponding wall portion and said blocking rotor while the second displacement rotor is spaced from its corresponding wall portion and said blocking rotor, and during the remainder of the revolution of said displacement rotors, said first displacement rotor is spaced from its corresponding wall portion and said blocking rotor and said second displacement rotor is simultaneously in sealing relation to its corresponding wall portion and said blocking rotor, said casing having inlet and outlet passages communicating respectively with the spaces between said blocking rotor and said first and second wall portions respectively.

11. A rotary positive displacement device for liquids comprising a hollow casing having inlet and outlet ports and a plurality of rotor-sealing wall portions intermediate said inlet and outlet ports, one defining a blocking wall portion and the remainder defining displacement cavities, a plurality of displacement rotors rotatably mounted in said casing in position to pass in sealing relation to an equal number of said rotor-sealing wall portions respectively, each said displacement rotor being disposed to pass in sealing relation to its sealing wall portion for an angle equal to 360° divided by the number of displacement rotors, a blocking rotor rotatably mounted in said casing and having alternate peripheral sealing portions and recesses, said sealing portions being positioned to pass successively in sealing relation with said sealing wall portion and said displacement rotors, and each being of an angular extent equal to 360° divided by the product of the number of displacement rotors and the number of recesses in the blocking rotor whereby each said sealing portion is in sealing relation with each of said displacement rotors while such rotor is in sealing relation with said casing, and said recesses being not greater in angular extent than said blocking wall portion and positioned to pass in spaced relation to said displacement rotors and said casing, and means interconnecting all of said rotors for simultaneous rotation in a fixed phase relation whereby said displacement rotors are successively and singly in sealing relation with said casing and simultaneously with said blocking rotor.

12. A rotary positive displacement device for liquids comprising a hollow casing having inlet and outlet ports, a blocking wall portion and a plurality of cylindrically arcuate sealing wall portions defining displacement cavities each equal in angular extent to 360° divided by the number of such cavities, a plurality of displacement rotors rotatably mounted in said casing and each having a projection positioned to sweep in sealing relation with one of said sealing wall portions respectively and a cylindrically convex sealing portion on the opposite side of the axis of rotation from said projection equal in angular extent to a displacement cavity, a blocking rotor rotatably mounted in said casing and having alternate recesses and cylindrically convex peripheral sealing portions, said recesses being positioned to receive said displacement rotors therethrough in spaced relation to said blocking rotor and said sealing portions each being equal in angular extent to 360° divided by the product of the number of displacement rotors and the number of recesses in said blocking rotor and being positioned to sweep successively in sealing relation with said blocking wall portion and with the sealing portions of said displacement rotors, the angles between the axes of adjacent displacement rotors relative to the axis of said blocking rotor being equal to 360° divided by the number of recesses in the blocking rotor less the angular extent of a convex surface on said blocking rotor and the angular extent of said blocking wall portion being at least as great as that of each of said convex peripheral portions, and means interconnecting all of said rotors for simultaneous rotation in a fixed phase relationship, whereby said displacement rotors are successively and singly in sealing relation with said casing and simultaneously with said blocking rotor.

13. A rotary positive displacement device for liquids comprising a hollow casing having inlet and outlet ports and a plurality of rotor-sealing wall portions intermediate said inlet and outlet ports, a plurality of displacement rotors rotatably mounted in said casing in position to pass in sealing relation to an equal number of said rotor-sealing wall portions respectively, each said displacement rotor being disposed to pass in sealing relation to its sealing wall portion for that portion of its revolution corresponding to the number of displacement rotors, a blocking rotor rotatably mounted in said casing and having peripheral portions alternate of which are positioned to pass successively in sealing relation with another of said sealing wall portions and said displacement rotors, each such said alternate portion being of such angular extent that it is in sealing relation with each of said displacement rotors only while such rotor is in sealing relation with said casing, and the remainder of the peripheral portions positioned to pass in spaced relation to said displacement rotors and of a peripheral extent not exceeding that of said other sealing wall portions, and means interconnecting all of said rotors for simultaneous rotation in a fixed phase relation whereby said displacement rotors are successively and singly in sealing relation with said casing and simultaneously with said blocking rotor.

14. The device as claimed in claim 13 wherein is provided two displacement rotors each disposed to pass in sealing relation with its sealing wall portion and with said blocking rotor for approximately 180°, with the axes of said displacement rotors disposed parallel to the axis of the blocking rotor and lying in planes passing through the axis of the blocking rotor and disposed at an angle of 90° to each other, and wherein said blocking rotor is provided with two sealing portions each of 90° extent.

15. The device as claimed in claim 13 wherein is provided two displacement rotors each disposed to pass in sealing relation with its sealing wall portion and with said blocking rotor for approximately 180°, with the axes of said displacement rotors disposed parallel to the axis of the blocking rotor and lying in a common plane passing through the axis of the blocking rotor, and wherein said blocking rotor is provided with three sealing portions each of 60° extent.

16. The device as claimed in claim 13 wherein is provided three displacement rotors each disposed to pass in sealing relation with its sealing wall portion and with said blocking rotor for approximately 120° with the axes of adjacent displacement rotors disposed parallel to the axis of the blocking rotor and lying in planes passing through the axis of the blocking rotor with each plane disposed at an angle of 60° to another of the planes, and wherein said blocking rotor is provided with four sealing portions each of 30° extent.

17. The device as claimed in claim 13 wherein is provided three displacement rotors each disposed to pass in sealing relation with its sealing wall portion and with said blocking rotor for approximately 120° with the axes of adjacent displacement rotors disposed parallel to the axis of the blocking rotor and lying in planes passing through the axis of the blocking rotor with each plane disposed at an angle of 80° to another of the planes, and wherein said blocking rotor is provided with three sealing portions each of 40° extent.

18. The device as claimed in claim 13 wherein is provided three displacement rotors each disposed to pass in sealing relation with its sealing wall portion and with said blocking rotor for approximately 120° with the axes of adjacent displacement rotors disposed parallel to the axis of the blocking rotor and lying in planes passing through the axis of the blocking rotor with each plane disposed at an angle of 60° to another of the planes, and wherein said blocking rotor is provided with two sealing portions each of 60° extent.

References Cited in the file of this patent

UNITED STATES PATENTS

| | | |
|---|---|---|
| 272,818 | Wilbraham et al. | Feb. 20, 1883 |
| 1,060,699 | Ogden | May 6, 1913 |
| 1,098,256 | Harper | May 26, 1914 |

FOREIGN PATENTS

| | | |
|---|---|---|
| 4,282 | Great Britain | Nov. 15, 1877 |
| 145,357 | Austria | Apr. 25, 1936 |